Figure 1:
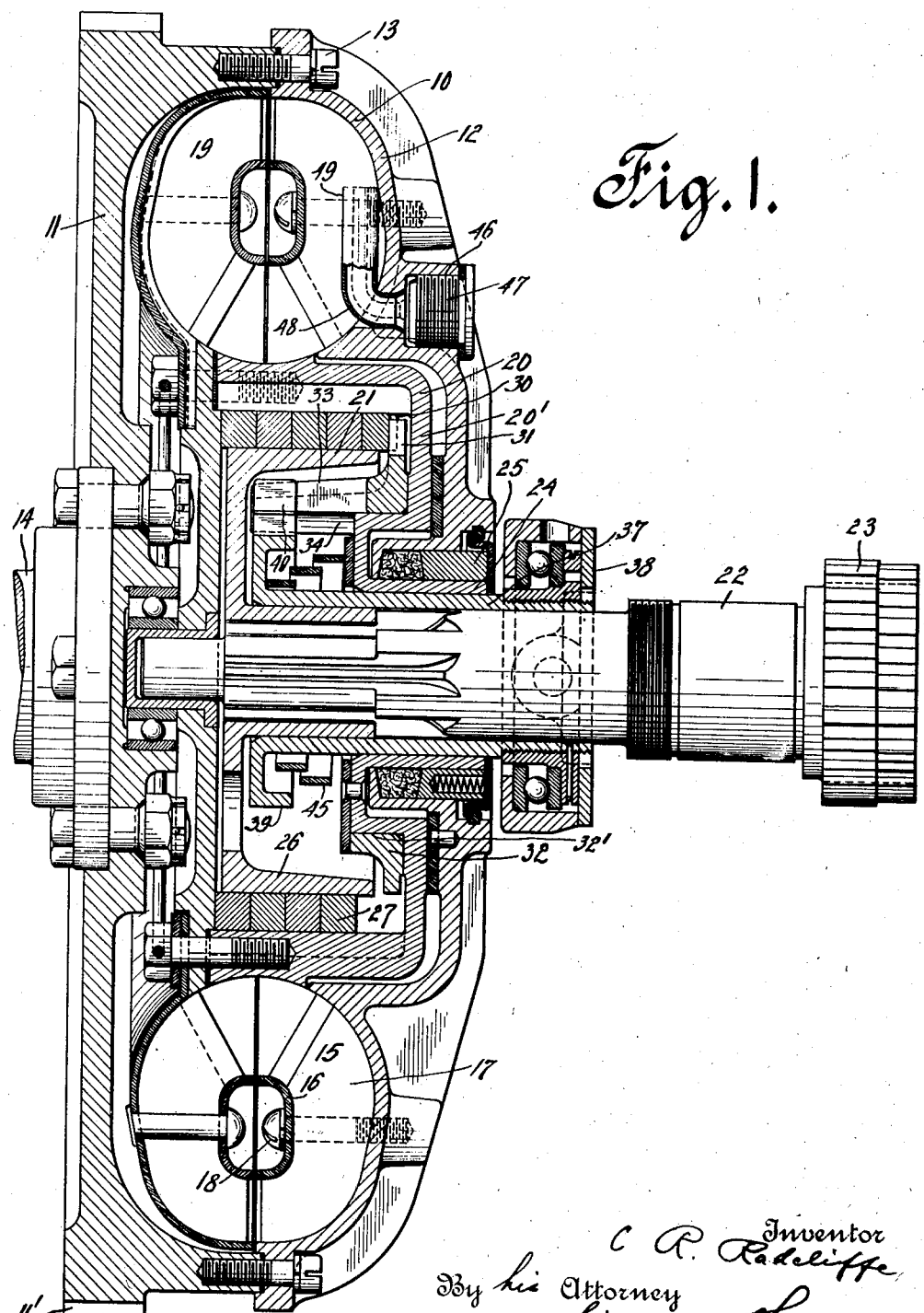

March 16, 1926.

C. R. RADCLIFFE 1,576,996

HYDRAULIC POWER TRANSMITTING APPARATUS

Filed August 3, 1920

5 Sheets-Sheet 3

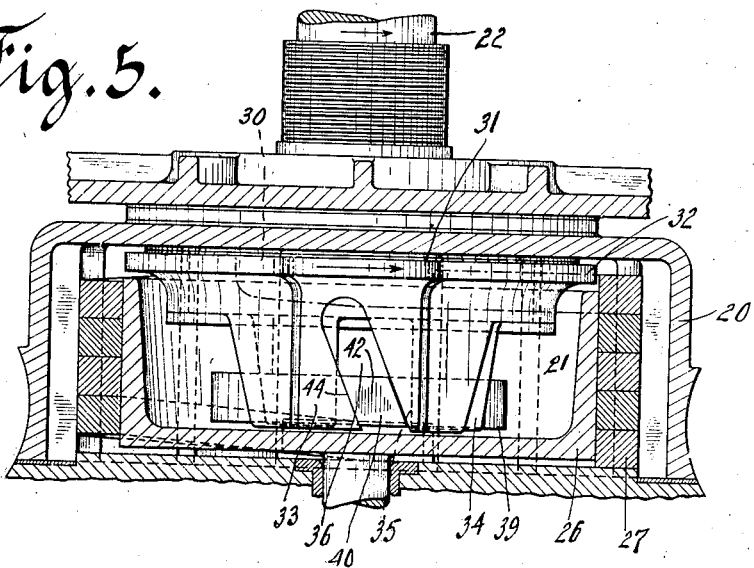
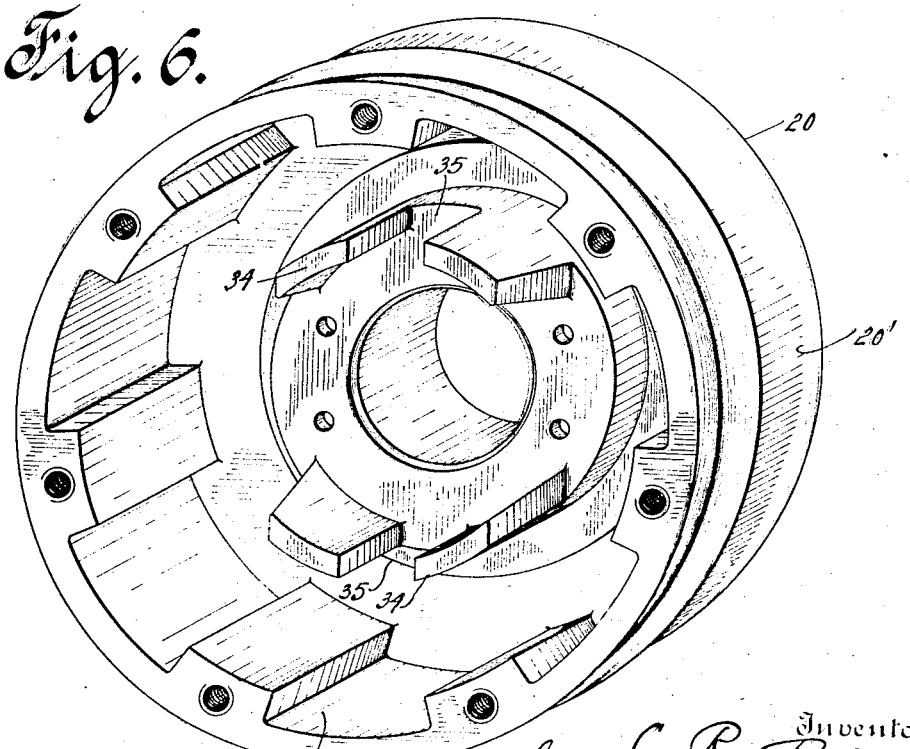

March 16, 1926.

C. R. RADCLIFFE

HYDRAULIC POWER TRANSMITTING APPARATUS

Filed August 3, 1920   5 Sheets-Sheet 5

C. R. Radcliffe, Inventor
By his Attorney
Sigmund Herzog

Patented Mar. 16, 1926.

1,576,996

UNITED STATES PATENT OFFICE.

CARLTON R. RADCLIFFE, OF NEW YORK, N. Y.

HYDRAULIC-POWER-TRANSMITTING APPARATUS.

Application filed August 3, 1920. Serial No. 400,984.

*To all whom it may concern:*

Be it known that I, CARLTON R. RADCLIFFE, a citizen of the United States, and a resident of New York, in the county of New York and State of New York, have invented certain new and useful Improvements in Hydraulic-Power-Transmitting Apparatus, of which the following is a specification.

The present invention relates to improvements in hydraulic power transmitting apparatus, especially adapted for use in connection with motor vehicles. The invention pertains more particularly to that type of hydraulic power transmitting devices, wherein a primary turbine wheel, in the form of a centrifugal pump impeller, and a secondary turbine wheel, in the form of the runner or rotor of a turbine, are combined, said wheels, in combination with the enclosing casing, being arranged in such a manner that the energy of the liquid developed in the primary wheel is transmitted to and utilized in said secondary wheel.

The main object of the invention is to provide a convenient mechanism, preferably located within the power transmitting apparatus, whereby the driven shaft thereof is adapted to be disconnected, at will, from the secondary turbine wheel of the apparatus, thus permitting the main driving gear of the change-speed gear of the motor vehicle to be freed from the power transmitting apparatus, so that an easy shifting of gears of the change-speed gear may be effected, when necessary.

Another object of the invention is to so construct the hydraulic power transmitting device of the type mentioned that it interchanges with the fly wheel and clutch in ordinary automobile design.

A further object of the invention is to make the connection between the driving shaft of a power transmitting apparatus and the secondary turbine wheel thereof in the form of a clutch, that is disposed within a fluid-tight housing, thereby permitting of the use of a lubricant of a character different from the liquid used, in the turbine wheels, as a propelling means.

A still further object of the invention is to so construct the power transmitting apparatus that its casing and impeller rotate, as a unit, independently of the runner and clutch, the two sets of elements contacting only at their supporting bearings and the whole being so constructed that a single stuffing box only is needed.

Another object of the invention is to provide a novel and convenient method of filling the device with an actuating liquid, in combination with a mechanism that indicates the level of the actuating fluid in the casing.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 2:
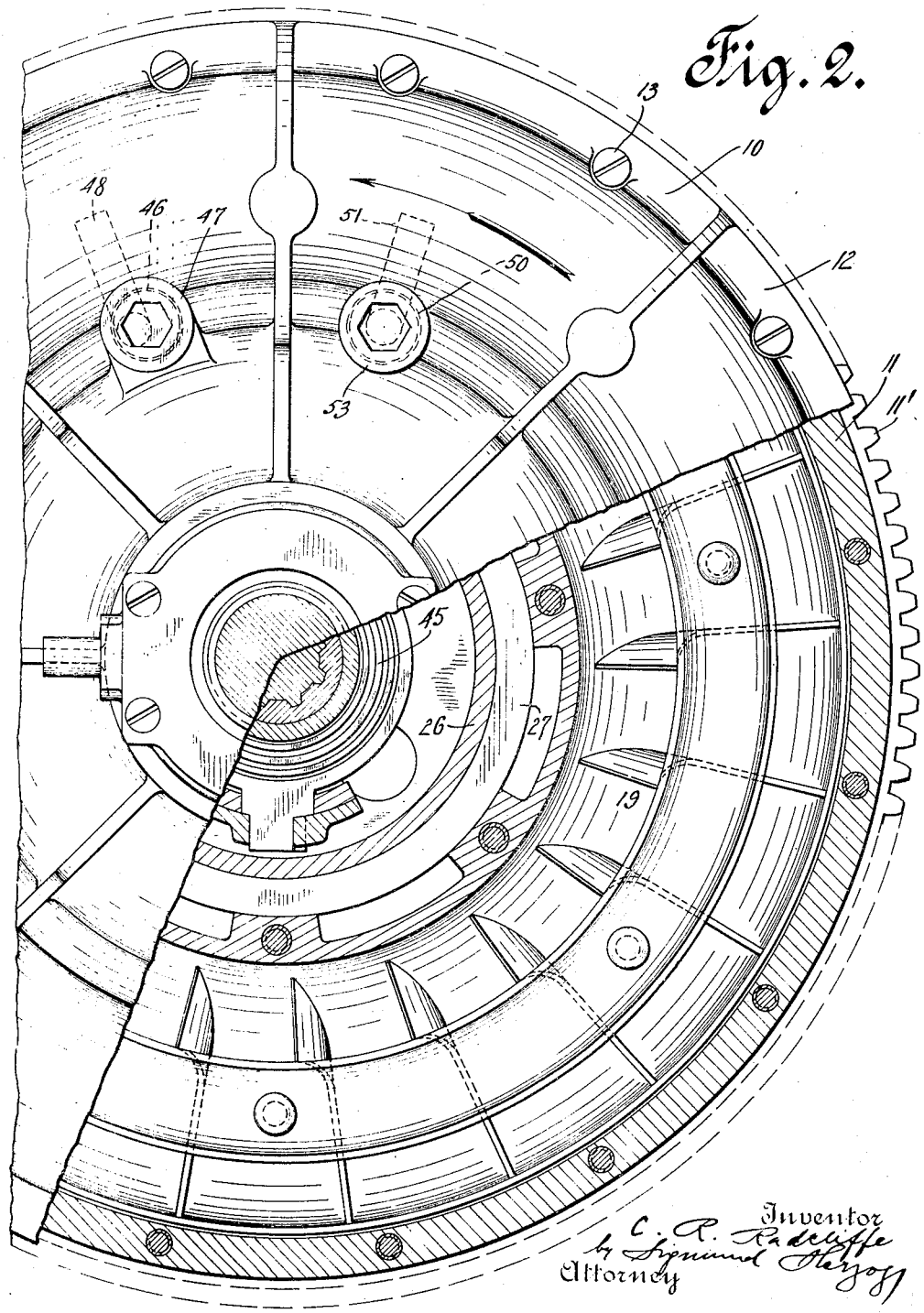
Figure 3:
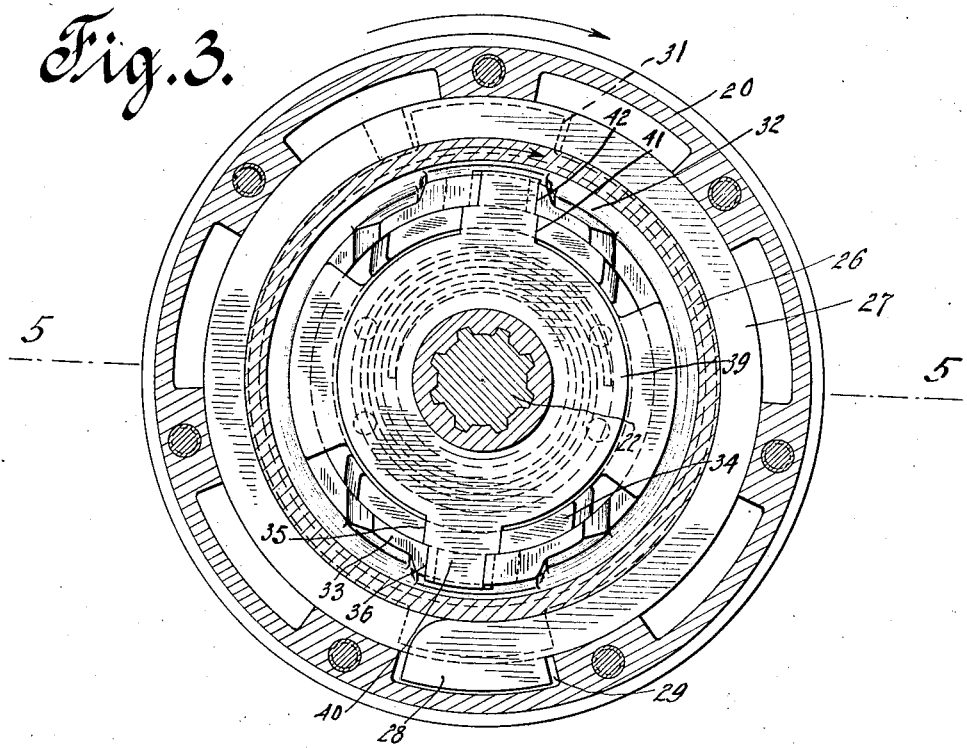
Figure 4:
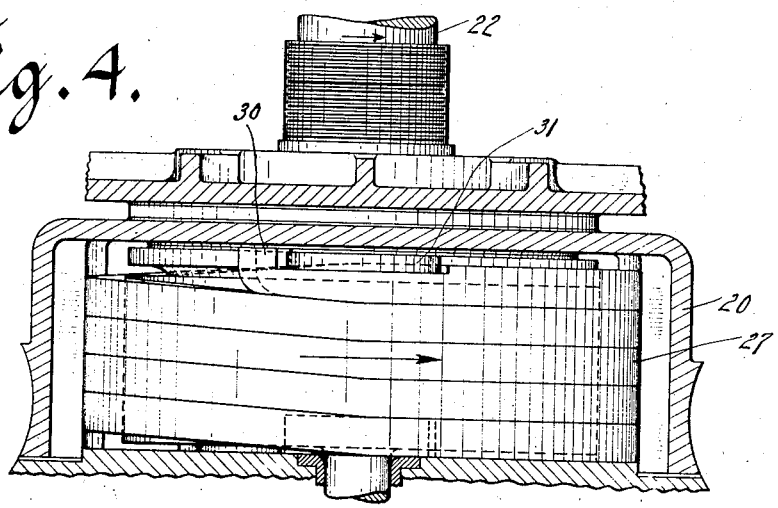
Figure 7:
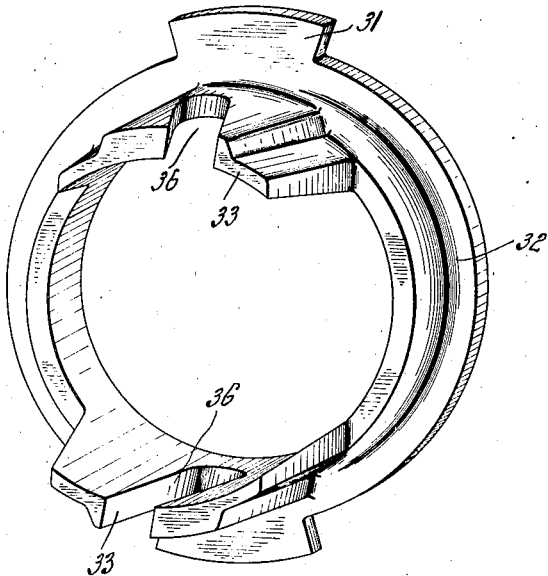
Figure 8:
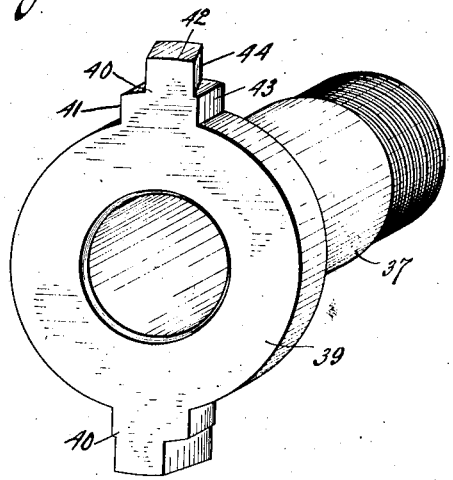

Figure 1 is a section taken through an apparatus, constructed in accordance with the present invention, in intersecting radial planes; Fig. 2 is a front elevation of the device, partly in section; Fig. 3 is a section taken through the clutch element of the device in a plane at right angles to the longitudinal axis of the driven shaft; Fig. 4 is a plan view of the clutch, part of the housing being broken away; Fig. 5 is a section taken on line 5—5 of Fig. 3, certain parts being shown in elevation; Fig. 6 is a perspective view of the clutch housing with its cover removed; and Figs. 7 and 8 are perspective views of elements of the clutch.

In the drawings, the numeral 10 indicates a closed casing, made, in the case illustrated in the drawings, of two parts 11 and 12. These two elements are suitably fastened together, for instance by screw-bolts 13, and form a hollow fly wheel, that is connected in any suitable manner with a driving shaft 14, for instance the crank shaft of an internal combustion engine.

Within the casing is disposed a primary turbine wheel 15, in the form of a centrifugal pump impeller. This wheel includes, in the present embodiment of the invention, the casing section 12, between which and a shrouding 16 are disposed radial blades or vanes 17, the shrouding being attached to the casing by screw-bolts 18, or otherwise, thereby clamping the vanes 17 in place. A secondary turbine wheel or rotor 19 is disposed within the casing, it being juxtaposed to the primary turbine wheel or impeller. This wheel may be of any suitable construction, it being bolted to a fluid-tight housing 20, which is connected by a clutch 21 with a driven shaft 22. The housing 20, disposed within the casing 10, contains the clutch. The driven shaft 22 carries the main driving gear 23 of the change-speed gear.

The driving shaft 14 and driven shaft 22 are disposed co-axially, the latter extending centrally through the housing 20. This housing is provided with a sleeve 24, which extends through a stuffing box 25 on the casing section 12, said stuffing box preventing leakage of oil from the co-operating turbine wheels.

The clutch 21 may be of any suitable construction. In the case illustrated, it comprises a drum 26, splined to the driven shaft 22 and co-operating with a helical spring 27, the latter being wound upon the cylindrical face of the drum. One end of said spring, denoted by the numeral 28, hooks into a recess 29 in the body portion 20' of the drum, while its other end, denoted by the numeral 30, engages a projection 31 of a ring-shaped member 32, the latter being oscillatably mounted upon an annular shoulder 32' on the interior of the housing 20. The member 32 is provided with two diametrically opposite forwardly projecting horizontal extensions 33. In alignment with and adjacent to these extensions there are formed upon the housing 20 extensions 34. The two extensions 34 are each provided with a slot 35, the two slots registering and extending in the direction of the longitudinal axis of the driven shaft 22. In each extension 33 is provided a slot 36. These last-mentioned slots extend horizontally and at an angle to the longitudinal axis of the driven shaft 22, more particularly in opposite directions as clearly appears from Fig. 7 of the drawings. Over the hub of the drum 26 and over the driven shaft 22 is drawn a sleeve 37, that extends outside of the casing 10 and is there provided with a collar 38, that is in engagement with a lever (not shown), for instance the clutch pedal usually employed upon motor vehicles. The inner end of the sleeve 37 is provided with a flange 39, having upon diametrically opposite portions thereof vertically extending lugs 40. Each of these lugs comprises two sections, denoted by the numerals 41 and 42, the sections 41 having parallel side faces 43 that extend in parallel relation to the longitudinal axis of the driven shaft 22 and are seated in the slots 35 of the extensions 34 on the housing 20. The sections 42 of the lugs have parallel side faces 44 which extend at an angle to the longitudinal axis of the shaft 22 and are seated in the slots 36 in the extensions 33 on the ring-shaped body 32. A spring 45, interposed between the flange 39 and the shouldered portion of the housing 20, has a tendency to keep the said flange properly spaced from the said shouldered portion. The clutch housing 20 contains a suitable lubricant, for the well-known purpose.

On the section 11 of the casing 10 is formed a gear 11', for engagement with the self-starter of the motor vehicle.

The whole casing, with the exception of the clutch housing, is filled with a suitable liquid, preferably oil, through an opening 46, closed by a plug 47. This opening extends through the casing section 12 and opens into a small L-shaped pipe 48, the larger leg 49 of which extends radially toward the peripheral portion of the casing. A second opening, denoted by the numeral 50, is formed in the casing section 12 adjacent the opening 46, it communicating with an L-shaped pipe 51, the larger leg of which extends also radially toward the peripheral portion of the casing. A plug 53 serves to close the opening 50. The apparatus is partly filled with a suitable liquid through either one of the openings 46 or 50, which are for this purpose brought into alignment with the inspection opening in the housing of the motor of the vehicle, when the larger legs of the two L-shaped pipes extend substantially vertically upwards. When in these positions, the plugs 47 and 53 are disengaged from the respective openings. An oil gun, or similar device, is then engaged with the threads of either one of the openings 46 or 50, and oil forced through the respective bent pipe into the casing, air escaping through the other pipe and the opening in alignment therewith. As soon as the level of oil reaches the free end of the air-pipe, it will overflow through the said pipe, indicating the fact that the desired level of liquid in the casing has been obtained, thereby precluding any possibility of charging the casing with more oil than required. Both openings are then closed by their plugs, whereby the device is ready for operation.

The primary and secondary wheels are, in the case illustrated in the drawings, arranged in such a manner that the outlet of the discharge side of the primary wheel fits as closely as possible the admission side of the secondary wheel, and the outlet or discharge side of the secondary wheel fits as closely as possible the inlet side of the primary wheel, although this feature is not essential as far as the invention herein described is concerned. It is to be observed that the housing 20 completes the circuit in which the actuating liquid flows, the said housing forming a continuation of the secondary wheel. This feature is provided for structural reasons only.

The operation of this device is as follows:—In the positions of the elements shown in Fig. 1 of the drawings, the clutch connects the secondary turbine wheel with the driven shaft 22, inasmuch as the spring 45 keeps the flange 39 on the sleeve 37 spaced from the shouldered portion of the housing 20. Due to this location, the spring 27 is tightly wound upon the drum 26, thereby forming a connecting link between the clutch housing 20 and the driven shaft 22. If, therefore, rotation is imparted to the driving shaft 14, the actuating fluid receives energy in the primary wheel, which is transmitted to the secondary wheel, from which the liquid returns again to the primary wheel. The secondary wheel is thus rotated, power being transmitted to the driven shaft 22. If the secondary turbine wheel is to be disconnected from the gear 23, in order to permit of an easy shift of gears in the change-speed gear, the clutch pedal above referred to is depressed so as to shift the flange 39 of the sleeve 37 toward the shouldered portion of the clutch housing 20. The flange is prevented from rotating in relation to the housing 20, inasmuch as the lug portions 41 slide in the slots 35. Due to the shifting of the flange 39, the ring-shaped body 32 is given a slight turn on the clutch housing 20, inasmuch as the slots 36 in the extensions 33 on the said ring-shaped member extend at an angle to the longitudinal axis of the driven shaft 22. By this slight turning movement, the spring 27 is unwound from the drum 26, thereby freeing the shaft 22 from the secondary turbine wheel. The drum has, due to its small size so little inertia that it permits of an easy gear shift being made. Without a clutch between the secondary turbine wheel and the driven shaft 22, it would be impossible to shift the gears from neutral position in the gear box into driving connection, while the motor is running, because the flow from the impeller to the runner and the friction between the runner and the casing, combined with the friction in the stuffing box, results in a drive even at the slowest speed to which a motor can be throttled.

It is to be observed that the driven member of the transmission rotates absolutely independent of the driving member, they contacting only at their supporting bearings.

The device, as herein described, is very compact and is easily interchangeable with the fly wheel and clutch mechanism ordinarily employed in motor vehicles. The weight of the device corresponds substantially to the combined weights of the flywheel and clutch mechanism of a motor vehicle, so that the employment of the device on a motor vehicle does not increase the weight of the vehicle or the load on the engine thereof.

In the device herein described the movement of the driving member is transmitted to the driven member by a liquid, which is caused to move across a space between said members, thereby providing a cushion against the shocks of the engine. The speed of the driven shaft may be varied by varying the speed of the driving shaft.

What I claim is:—

1. In a hydraulic power transmitting apparatus, the combination with a primary turbine wheel, of a secondary turbine wheel, the outlet of the discharge side of said primary wheel fitting as closely as possible the admission side of said secondary wheel and the outlet of the discharge side of said secondary wheel fitting as closely as possible the inlet side of said primary wheel, a casing enclosing said wheels, a driven shaft, and means disposed within said casing for connecting or disconnecting, at will, said secondary turbine wheel and said driven shaft, said wheels being relatively immovable in the direction of the longitudinal axis of said driven shaft.

2. In a hydraulic power transmitting apparatus, the combination with a primary turbine wheel, of a secondary turbine wheel, the outlet of the discharge side of said primary wheel fitting as closely as possible the admission side of said secondary wheel and the outlet of the discharge side of said secondary wheel fitting as closely as possible the inlet side of said primary wheel, a casing inclosing said wheels, a driven shaft, and a clutch within said casing between said secondary turbine wheel and said driven shaft, said wheels being relatively immovable in the direction of the longitudinal axis of said driven shaft.

3. A hydraulic power transmitting apparatus according to claim 2, comprising a housing for said clutch closed fluid-tight in relation to said casing.

4. In a hydraulic power transmitting apparatus, the combination with a driving shaft, of a casing rotating therewith, a driven shaft, a primary turbine wheel disposed within and fixed to said casing, a secondary turbine wheel within said casing, and means also disposed within said casing for connecting or disconnecting, at will, said secondary turbine wheel and said driven shaft.

5. In a hydraulic power transmitting apparatus, the combination with a driving shaft, of a casing rotating therewith, a driven shaft, a primary turbine wheel disposed within and fixed to said casing, a secondary turbine wheel within said casing, and a clutch also disposed within said casing between said secondary turbine wheel and said driven shaft.

6. A hydraulic power transmitting apparatus according to claim 5, comprising a housing for said clutch closed fluid-tight in relation to said casing.

7. A hydraulic power transmitting apparatus according to claim 1, the connection and disconnection being made between said secondary turbine wheel and said driven shaft while holding said elements against relative movement in the direction of the longitudinal axis of said driven shaft.

8. In a hydraulic power transmitting apparatus according to claim 2, said clutch being rendered both operative and inoperative while holding the elements connected by said clutch against relative movement in the direction of the longitudinal axis of said driven shaft.

9. In a hydraulic power transmitting apparatus, the combination with a driving shaft, of a primary turbine wheel fixed thereto, a secondary turbine wheel, the outlet of the discharge side of said primary wheel fitting as closely as possible the admission side of said secondary wheel and the outlet of the discharge side of said secondary wheel fitting as closely as possible the inlet side of said primary wheel, a driven shaft, said two shafts being bodily immovable in relation to one another and means for connecting or disconnecting, at will, said secondary turbine wheel and said driven shaft.

10. In a hydraulic power transmitting apparatus, the combination with a driving shaft, of a primary turbine wheel fixed thereto, a secondary turbine wheel, a driven shaft, the outlet of the discharge side of said primary wheel fitting as closely as possible the admission side of said secondary wheel and the outlet of the discharge side of said secondary wheel fitting as closely as possible the inlet side of said primary wheel and a clutch between said secondary turbine wheel and said driven shaft, said two shafts being bodily immovable in relation to one another.

11. In a hydraulic power transmitting apparatus according to claim 10, said clutch being adapted to be rendered both operative and inoperative while holding the elements connected thereby bodily stationary.

12. In a hydraulic power transmitting apparatus, the combination with a primary turbine wheel, of a secondary turbine wheel, the outlet of the discharge side of said primary wheel fitting as closely as possible the admission side of said secondary wheel and the outlet of the discharge side of said secondary wheel fitting as closely as possible the inlet side of said primary wheel, a driven shaft, said wheels being relatively immovable in the direction of the longitudinal axis of said driven shaft, and a driving connection between said secondary turbine wheel and said driven shaft permitting said driven shaft to come to a stop while maintaining the rotation of said secondary turbine wheel.

13. In a hydraulic power transmitting apparatus, the combination with a primary turbine wheel, of a secondary turbine wheel, the outlet of the discharge side of said primary wheel fitting as closely as possible the admission side of said secondary wheel and the outlet of the discharge side of said secondary wheel fitting as closely as possible the inlet side of said primary wheel, a casing inclosing said wheels, a driven shaft, said wheels being relatively immovable in the direction of the longitudinal axis of said driven shaft, and a driving connection between said secondary turbine wheel and said driven shaft allowing the latter to come to a stop while maintaining the rotation of said secondary turbine wheel.

14. In a hydraulic power transmitting apparatus according to claim 13, said driving connection being disposed within said casing.

15. In a hydraulic power transmitting apparatus according to claim 2, said clutch being concentrically located with one of said wheels.

16. In a hydraulic power transmitting apparatus according to claim 2, said clutch being concentrically located with both of said wheels.

17. In a hydraulic power transmitting apparatus according to claim 5, said clutch being concentrically located with one of said wheels.

18. In a hydraulic power transmitting apparatus according to claim 5, said clutch being concentrically located with both of said wheels.

19. In a hydraulic power transmitting apparatus, the combination with a driving shaft, of a casing rotating therewith, a driven shaft, a primary turbine wheel disposed within and fixed to said casing, a secondary turbine wheel within said casing, a clutch also disposed within said casing between said secondary turbine wheel and said driven shaft, a fluid tight housing for said clutch, said housing extending through said casing, and a stuffing box surrounding the extension of said housing.

Signed at New York, in the county of New York, and State of New York, this 1st day of July, 1920.

CARLTON R. RADCLIFFE.